No. 730,317. PATENTED JUNE 9, 1903.
E. E. THOMAS.
DISK LUMBER CONVEYER FOR DOUBLE CUTTING BAND MILLS.
APPLICATION FILED DEC. 1, 1902.
NO MODEL. 3 SHEETS—SHEET 1.

Witnesses
Inventor
Edwin E. Thomas
BY
His Attorneys

No. 730,317. PATENTED JUNE 9, 1903.
E. E. THOMAS.
DISK LUMBER CONVEYER FOR DOUBLE CUTTING BAND MILLS.
APPLICATION FILED DEC. 1, 1902.
NO MODEL. 3 SHEETS—SHEET 2.

Witnesses
Inventor
Edwin E. Thomas
By Paul & Paul
His Attorneys

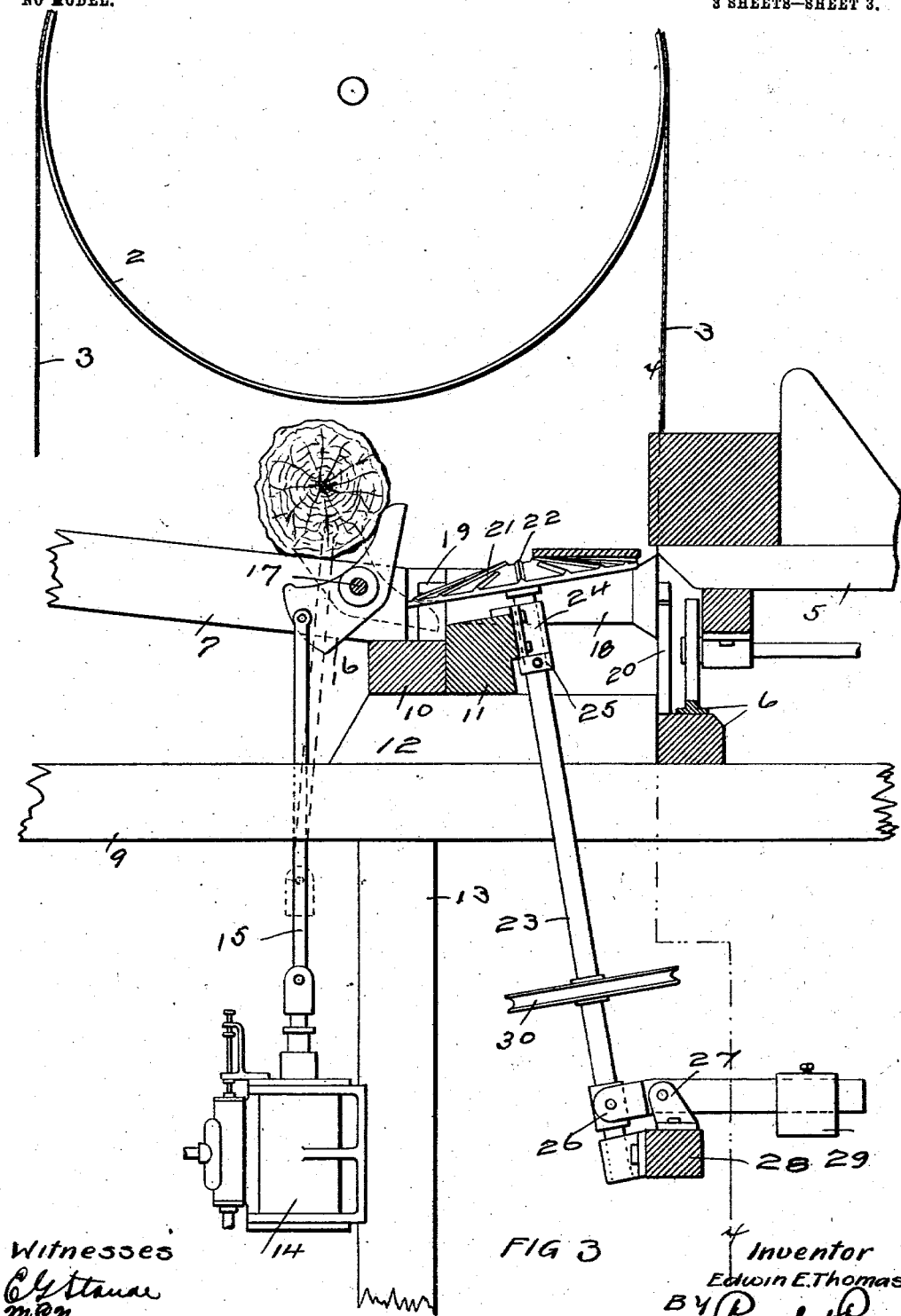

No. 730,317. Patented June 9, 1903.

UNITED STATES PATENT OFFICE.

EDWIN E. THOMAS, OF ST. PAUL, MINNESOTA, ASSIGNOR OF ONE-HALF TO UNION IRON WORKS, OF MINNEAPOLIS, MINNESOTA, A CORPORATION OF MINNESOTA.

DISK LUMBER-CONVEYER FOR DOUBLE-CUTTING BAND-MILLS.

SPECIFICATION forming part of Letters Patent No. 730,317, dated June 9, 1903.

Application filed December 1, 1902. Serial No. 133,373. (No model.)

*To all whom it may concern:*

Be it known that I, EDWIN E. THOMAS, of St. Paul, in the county of Ramsey, State of Minnesota, have invented certain new and useful Improvements in Disk Lumber-Conveyers for Double-Cutting Band-Mills, of which the following is a specification.

My invention relates to improvements in sawmill machinery, and designed particularly for use with double-cutting band-mills.

The object of the invention is to provide a conveyer between the log-deck and saw for taking away the lumber that is cut on the return or backward movement of the carriage.

A further object is to provide a conveyer which will cause the lower edges of the lumber to swing outwardly as it falls thereon and immediately assume a proper flatwise carrying position.

A further object is to provide a conveyer between the log-deck and double-cutting saw which in advancing the lumber lengthwise will also impart a slight lateral movement thereto to prevent it from coming in contact with and being clipped by the saw.

A further object is to provide a conveyer which will in no way interfere with the operation of loading the logs from the deck to the carriage.

Other objects of the invention will appear from the following detailed description.

The invention consists generally in a revolving disk normally projecting above the surface of a roll and having an obliquely-arranged axis or shaft whereon it is mounted, said shaft being movable lengthwise and yieldingly held in its raised position.

Further, the invention consists in various constructions and combinations, all as hereinafter described, and particularly pointed out in the claims.

Figure 1:
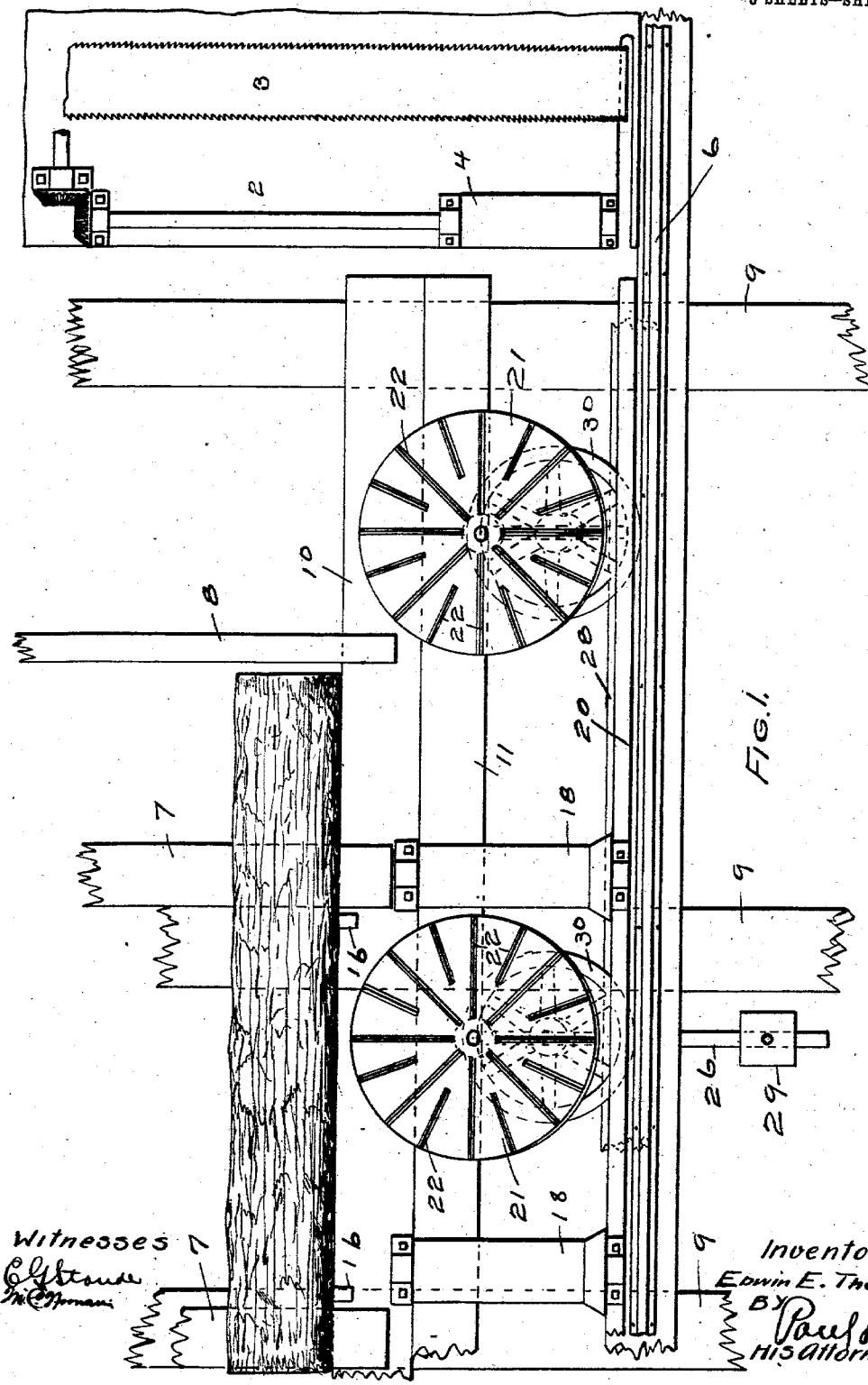
Figure 2:
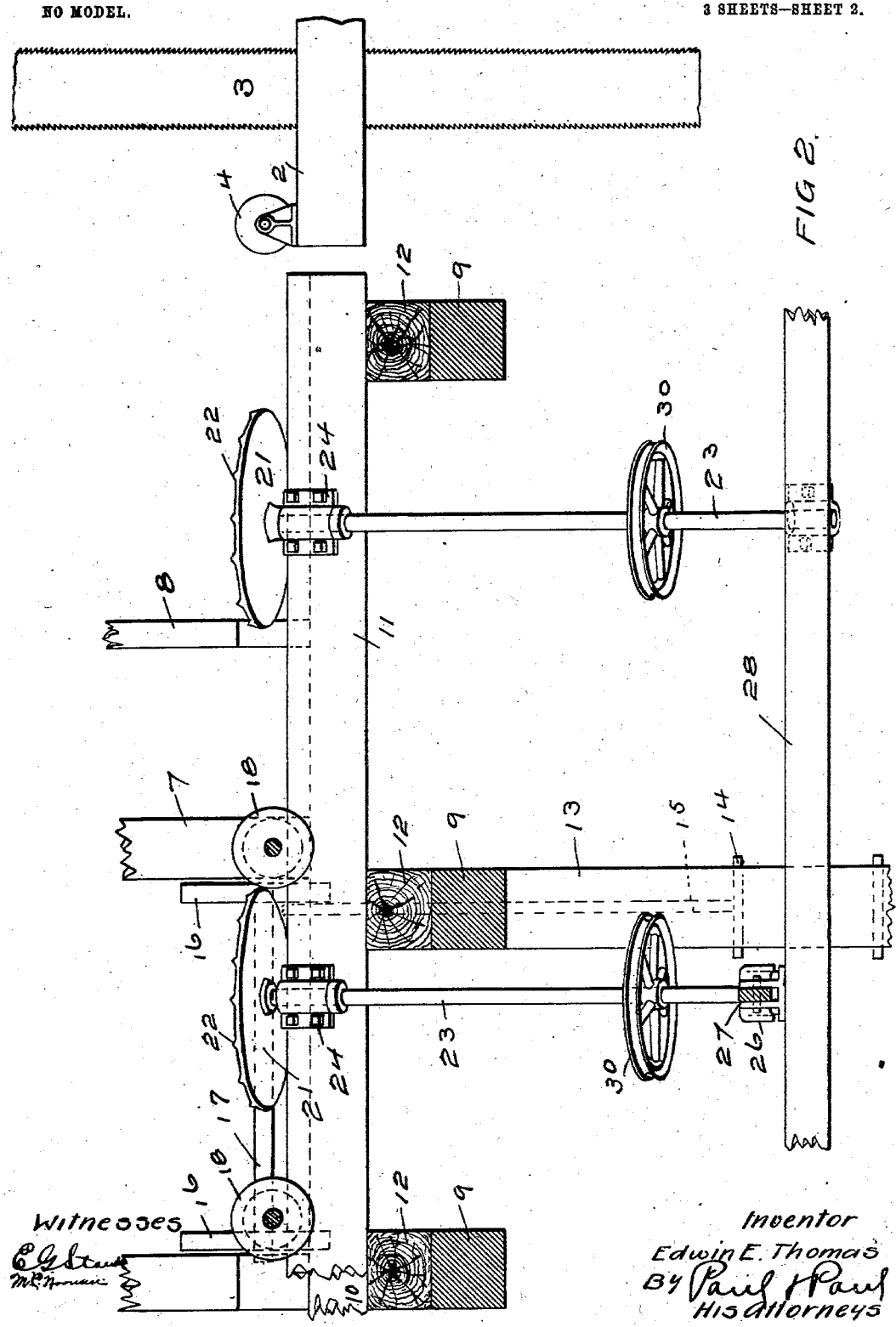

In the accompanying drawings, forming part of this specification, Figure 1 is a plan view of a portion of a double-cutting band-mill with the log deck and carriage, showing my invention applied thereto. Fig. 2 is a side elevation, partially in section, looking toward the discharge end of the log-deck. Fig. 3 is an end elevation looking toward the saw.

In the drawings, 2 represents the band-mill; 3, the saw; 4, one of the live-rolls usually found upon each side of the mill; 5, the log-carriage; 6, the track, and 7 the log-deck, between which and the carriage and saw my improved conveying mechanism is arranged.

8 represents the log-stop at the end of the deck, and 9 a series of cross-timbers whereon the track 6 and the timbers 10 and 11 are supported. Blocks 12 are preferably provided beneath the ends of the timbers 10 and 11 to raise them to a suitable height with respect to the opposite end of the log-deck. Secured to a post 13 beneath the timbers 9 is an engine 14 of ordinary construction and operated in the usual way, having its piston-rod 15 connected with a combined log-stop and kicker 16, that is mounted upon a shaft 17 near the discharge end of the log-deck. This form of stop and kicker is of ordinary construction, and I make no claim to the same herein. Between the log-deck and the carriage I provide beveled-end idle rolls 18, journaled in timbers 19 and 20 and on a level substantially with the log-skids at the discharge end of the deck and having their beveled ends projecting up a sufficient distance at the ends of the head-blocks to form inclined planes over which the logs can be easily and conveniently rolled from the deck to the carriage. These beveled-end rolls have been illustrated and described in Letters Patent of the United States, issued to me on the 26th day of August, 1902, No. 707,806, and need no detailed reference herein. Between the idle rolls 18 I provide a disk 21, having, preferably, a crowning upper face provided with a series of radial ribs 22, and said disk is secured on a shaft or axis 23, that is obliquely mounted in a bearing 24 on the timber 11. The shaft 23 has a sliding movement in its bearing, limited in one direction by the collar 25 and in the other by the hub of the disk. The lower end of the shaft 23 is provided with an arm 26, pivotally supported in a bracket 27 on a timber 28 and having an adjustable weight 29, that is arranged to normally hold the collar 25 against the bearing of the shaft and the upper surface of the disk above the level of the idle rolls, so that when the lumber falls from the carriage on its backward movement it will drop upon the surface of the disk and be immediately set in motion lengthwise past the saw. When it is desired to load a log on the carriage, the weight of the log will depress the shaft 23, lift the weight 29, and allow the log to bear directly upon the idle rolls without subjecting the conveying mechanism or the bearings therefor to any unusual or dangerous strain. At a point between the log-deck and saw, preferably opposite the end of the stop, I prefer to provide a second disk, which need not, however, be movable vertically in its bearings, as it is out of the path of the log rolling from the deck to the carriage. Both of these disks are driven in any suitable way, preferably by a rope belt passing over pulleys 30 on the shafts 23.

The disks and their shafts are arranged at substantially the same inclination, and it will be noted from an examination of Fig. 3 that the side of the disk next to the carriage is substantially level and above the surface of the idle roll and traveling in a curved path will cause the lower edges of the lumber as it falls from the carriage to swing outwardly, so that the lumber will immediately assume a proper flatwise carrying position on the conveyer, and the movement of the disk will also impart a slight lateral as well as a forward movement to the lumber and prevent its ends from coming in contact with and being clipped by the saw, which has been found to be a serious objection to the use of an ordinary conveyer or rolls between the deck and saw of a double-cutting mill. The disks may be made of any suitable size, and there may be two or more of them, if preferred.

I claim as my invention—

1. The combination, with a saw, of a log-carriage and a revolving disk lumber-conveyer provided near said carriage and whereon the lumber falls as it is cut from the log.

2. The combination, with a saw, of a log-carriage, a revolving disk lumber-conveyer provided near said carriage and arranged at an incline with respect to the top of the same and in position to receive the lumber as it is cut from the log.

3. The combination, with a log deck and carriage, of an idle roll interposed between them, a revolving disk provided near said roll, said disk being vertically movable and inclined with respect to the plane of said roll and yieldingly held above the same.

4. The combination, in a double-cutting band-mill, with the log deck and carriage, of a revolving inclined disk provided between the deck and carriage and whereon the lumber falls that is cut on the backward or return movement of the carriage.

5. The combination, in a double-cutting band-mill, with the log deck and carriage, of two or more revolving disks having roughened or ribbed upper surfaces and arranged at an incline near the carriage and whereon the lumber falls that is cut on the return or backward movement of the same.

6. The combination, with a log deck and carriage, of a revolving disk provided near said roll and having a convex upper surface, said disk being obliquely arranged with respect to the plane of said carriage and the radius of said disk at its highest point being substantially horizontal.

7. The combination, with a log deck, carriage and idle roll, of a revolving inclined disk provided near said roll and vertically movable in its bearings and normally projecting above the surface of said roll, and means for revolving said disk.

8. The combination, with a log deck, carriage and idle roll, of a revolving inclined disk having a roughened upper surface, an obliquely-arranged shaft having a longitudinal movement in its bearings and whereon said disk is mounted, means for normally holding said shaft in its raised position with a yielding pressure, and means for driving said shaft.

9. The combination, in a double-cutting band-mill, with the log deck and carriage, of idle rolls provided between the same, a revolving disk having a roughened upper surface also arranged between said deck and carriage and vertically movable in its bearings and normally projecting above said rolls and adapted to be depressed by the weight of a log thereon, a second revolving disk provided between said first-named disk and the saw, and means for driving said disk.

10. The combination, with the log deck and carriage, of idle rolls provided between the same, an obliquely-arranged shaft mounted in bearings between said deck and carriage and having a limited longitudinal movement, a weight for normally holding said shaft in its raised position, and a disk having a roughened surface provided at the upper end of said shaft and normally projecting above the surface of said rolls.

11. The combination, in a double-cutting band-mill, with a log deck and carriage, of idle rolls provided between the same and serving as skids over which the logs are rolled from the deck to the carriage, beveled ends provided on said rolls near the carriage headblocks, a revolving disk provided between the deck and carriage and whereon the lumber falls that is cut on the backward or return movement of the carriage, said disk being arranged at an incline and vertically movable in its bearings, the upper portion of said disk being normally above the surface of said rolls, and means for yieldingly holding said disk in its raised position.

12. The combination, in a double-cutting band-mill, with a log deck and carriage, of a series of idle rolls provided between the deck and carriage, two or more revolving disks provided near said rolls, obliquely-arranged shafts whereon said disks are mounted, said disks normally projecting above the level of said rolls, one of said shafts being longitudinally movable in its bearings to permit the depression of its disk when a certain predetermined weight is placed thereon, means for yieldingly holding said longitudinally-movable shaft in its raised position, and means for driving said shafts.

13. The combination, with a log deck and carriage and a saw, of revolving lumber-conveying disks provided near said carriage between said deck and saw, said disks being obliquely arranged with respect to the top of said carriage, a roll, and one of said disks being yieldingly held above the level of said roll.

14. The combination, with a band-saw and a log deck and carriage, of revolving lumber-conveying disks provided between said deck and saw, said disks being arranged obliquely with respect to the top of the carriage in position to receive the lumber therefrom as it is cut from the log, and means for revolving said disks.

In witness whereof I have hereunto set my hand this 28th day of November, 1902.

EDWIN E. THOMAS.

In presence of—
RICHARD PAUL,
M. C. NOONAN.